United States Patent
Vanni

(10) Patent No.: US 10,788,111 B2
(45) Date of Patent: Sep. 29, 2020

(54) TORQUE CONVERTER COVER FOR SUPPLYING COOLING TO A HYBRID ELECTRIC MOTOR

(71) Applicant: SCHAEFFLER TECHNOLOGIES AG & CO. KG, Herzogenaurach (DE)

(72) Inventor: Jeremy Vanni, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 99 days.

(21) Appl. No.: 15/838,415

(22) Filed: Dec. 12, 2017

(65) Prior Publication Data

US 2019/0178356 A1 Jun. 13, 2019

(51) Int. Cl.
| | | |
|---|---|---|
| *F16H 41/30* | (2006.01) | |
| *H02K 9/19* | (2006.01) | |
| *H02K 7/10* | (2006.01) | |
| *H02K 5/04* | (2006.01) | |

(52) U.S. Cl.
CPC .............. *F16H 41/30* (2013.01); *H02K 5/04* (2013.01); *H02K 7/10* (2013.01); *H02K 9/19* (2013.01)

(58) Field of Classification Search
CPC ....... F16H 41/30; F16H 57/0476; H02K 5/04; H02K 9/19; H02K 7/10
USPC .............................................. 310/52, 54, 59
See application file for complete search history.

(56) References Cited

U.S. PATENT DOCUMENTS

| | | | | |
|---|---|---|---|---|
| 8,110,952 B2* | 2/2012 | Wakita | ................... | H02K 11/25 310/52 |
| 10,024,408 B2* | 7/2018 | Johnson | ................... | F02B 73/00 |
| 10,468,949 B2* | 11/2019 | Yamagishi | ............... | H02K 9/19 |
| 2010/0033040 A1* | 2/2010 | Wakita | ................... | H02K 11/25 310/54 |
| 2010/0215526 A1* | 8/2010 | Saari | ........................ | H02K 9/04 417/423.8 |
| 2012/0091835 A1* | 4/2012 | Kim | ........................ | H02K 9/19 310/54 |
| 2013/0088113 A1* | 4/2013 | Yu | .......................... | H02K 29/03 310/156.38 |
| 2015/0152948 A1* | 6/2015 | Johnson | ................... | B60K 6/26 60/337 |
| 2016/0137047 A1* | 5/2016 | Lim | ........................ | H02K 7/006 290/19 |
| 2019/0178356 A1* | 6/2019 | Vanni | ........................ | H02K 5/04 |
| 2020/0072331 A1* | 3/2020 | Ubelhart | ................. | F16H 45/02 |

FOREIGN PATENT DOCUMENTS

WO 2014022698 A1 2/2014

* cited by examiner

*Primary Examiner* — John K Kim
(74) *Attorney, Agent, or Firm* — Brooks Kushman P.C.

(57) ABSTRACT

A cover for a torque converter and an electric motor, comprising a cover surface that includes a first cluster of perforations that are located adjacent to a first end of a rotor of the motor, wherein the perforations are arranged to transfer fluid from the torque converter to a rotor of the electric motor.

12 Claims, 1 Drawing Sheet

TORQUE CONVERTER COVER FOR SUPPLYING COOLING TO A HYBRID ELECTRIC MOTOR

TECHNICAL FIELD

The present disclosure is related to a torque converter cover, such as those covers that are utilized in hybrid vehicles.

BACKGROUND

Some hybrid architectures (e.g. P1 hybrid architecture) include a crankshaft of the internal combustion engine that is mounted (e.g. directly connected) to the electric motor. The P1 hybrid architecture may also not include a lock-up clutch located prior to the electric motor. The electric motor may function as a generator during vehicle deceleration, as an engine starter, and as a motor (to assist the engine) during vehicle accelerations. The electric motor may need to be cooled in such hybrid architectures.

SUMMARY

A first embodiment discloses, a torque converter cover, comprising a cover surface for a torque converter having a plurality of perforations, wherein the plurality of perforations includes a first cluster of perforations that are located adjacent to a first end of a rotor of an electric motor, and a second cluster of perforations that are located adjacent to a second end of the rotor.

A second embodiment discloses, a cover that is configured to cover a torque converter, comprising a cover surface that includes a first hole located adjacent to a first end of a rotor of an electric motor and a second hole located adjacent to a second end of the rotor, wherein the holes are configured to radially spray fluid from the torque converter to a rotor of the electric motor.

A third embodiment discloses, a cover for a torque converter, comprising a cover surface of the cover that includes a first section of one or more perforations that are located adjacent to a rotor of the motor, and wherein the perforations are configured to transfer fluid from the torque converter to a rotor of the electric motor.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A hybrid architecture, in general, includes a powertrain. The powertrain includes an engine that drives a transmission. The transmission may include an electric machine such as an electric motor/generator, an associated traction battery, a torque converter, and a multiple step-ratio automatic transmission, or gearbox. The engine and the electric motor may both be drive sources for the vehicle. The engine generally represents a power source that may include an internal combustion engine such as a gasoline, diesel, or natural gas powered engine, or a fuel cell. The engine generates an engine power and corresponding engine torque that is supplied to the electric motor when a disconnect clutch between the engine and the electric motor is at least partially engaged. The electric motor may be implemented by any one of a plurality of types of electric machines. For example, electric motor may be a permanent magnet synchronous motor. Power electronics condition direct current (DC) power provided by a battery to the requirements of the electric motor. For example, power electronics may provide three phase alternating current (AC) to the electric motor.

In a P1 configuration of a hybrid vehicle, the electric machine or motor may be connected directly with the crankshaft of the internal combustion engine. In such a P1 architecture, there may not be a mechanical disconnection of the electric motor from the engine. Furthermore, there may not be a lock-up clutch prior to the electric motor in the P1 architecture. The torque converter cover described below may be utilized in a P1 configuration, as well as a P2 hybrid configuration that includes a motor/generator that is coupled to the engine through the clutch, or other hybrid architectures. The P2 hybrid architecture may be a parallel hybrid with a clutch connecting a single electrical motor and the engine crankshaft. Such a P2 hybrid may utilize a conventional transmission. However, the arrangement in a P2 hybrid configuration may be a compact arrangement.

Figure 1:
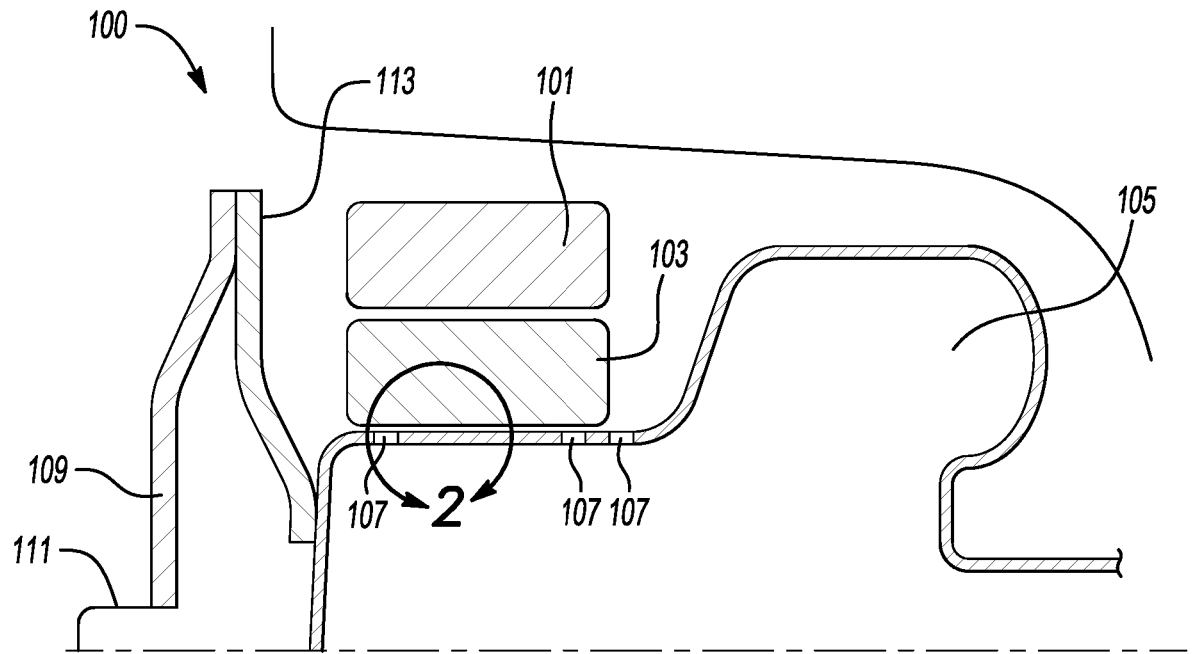
FIG. 1 illustrates an overview of a cross-section of a portion of a torque converter in a motor vehicle and FIG. 2 illustrates an exploded view of the perforations 107.

FIG. 1 is an example of a cross-section 100 of a portion of a torque converter. The torque converter 105 may include a torque converter cover. The torque converter cover may refer to a part of the torque converter that is on an engine side of a closure weld used to enclose the torque converter 105. The torque converter cover may include holes 107 or perforations 107. The holes 107 or perforations found in the torque converter cover may be of any shape (e.g. circular, irregular, square, oval, etc.) or may be of any size. The holes 107 may be placed in the torque converter 105 in an area that allows the torque converter clutch and the damper underneath the electric motor rotor 103 to utilize space that allows the torque converter clutch (e.g. wet clutch) to be placed underneath the rotor 103 and allow automatic transmission fluid into that area. This may allow the electric motor to cool both the electric motor and the torque converter clutch. The electric motor may be outside of the torque converter 105 in a wet spray environment. The holes 107 may allow approximately 1-2 liters per minute of automatic transmission fluid to be sprayed onto the electric motor. The holes 107 may be relatively small given (e.g. 1 mm in diameter) that the torque converter is a pressure vessel. For example, each section of holes 107 may include three 1 millimeter holes that are 120 degrees about an axis of rotation (as shown in the centerline) of FIG. 1. Of course, one of ordinary skill in the art would understand that other sizes of holes and the quantity of holes may vary, as well as the spacing and angle that the holes are arranged about an axis of rotation may vary and be used. Given that the torque converter 105 is a pressure vessel, it's against the traditional notion to insert such holes 107 or perforations in the torque converter 105, however, according to this disclosure the perforations 107 described below provide an advantage of cooling the electric motor utilizing fluid found in the torque converter 105. The ends of the electric motor stator 101 may have end copper wirings that are locations that may be cooled. The ends of the stator 101 may be cooled by the fluid sprayed from the holes 107. Because the torque converter 105 is rotating radially, the fluid that exits the holes 107 in the torque converter cover may be sprayed radially outward.

The engine crankshaft 111 may be utilized to convert the linear or reciprocating motion of the piston into rotary motion. The crankshaft 111 may be the main rotating component of an engine and may be made of iron. In a P1 configuration, the electric machine or motor may be connected directly with the crankshaft 111 of the internal combustion engine. The engine flex plate 109 may be a metal disk that is connected to the output from an engine (e.g. crankshaft) to the input of a torque converter in an automatic transmission. The drive plate 113 may be utilized to attach the flexplate 109 to a cover of the torque converter 105. In other embodiments, the drive plate 113 may be substituted by either lugs or studs (or other fastening means) that attach directly to the torque converter cover.

The holes 107 that are located on the cover of the torque converter 105 may allow the torque converter clutch and damper to be located in a compact environment, such as underneath the electric motor (e.g. the electric motor stator 101 and the electric motor rotor 103). The holes 107 may be located adjacent to the opposite ends of the electric rotor 103. In other embodiments, the holes 107 may be located anywhere along the cover of the torque converter 105. However, if the holes 107 are not at located adjacent the ends of the electric motor to allow the end of the stator 101 to be cooled, the fluid may need to utilize ramps or another type of tapered surface to help move the fluid to the ends of the electric motor stator 101.

The torque converter 105 may be rotating while in use, thus allowing the fluid that is emitted from the holes 107 to be output radially outward from the holes 107. Thus, such holes 107 may allow fluid to be emitted or sprayed onto the electric motor stator 101, as well as the rotor 103. The ends of the electric motor stator 101 may include copper wiring (not shown) that may be required to be cooled.

Cooling requirements may vary from vehicle to vehicle, thus the holes 107 that are inserted into the cover surface of the torque converter 105 may vary in size based on the vehicle's cooling requirements. For instance, in one embodiment, seven holes that are 1 mm in diameter may provide adequate cooling flow for a certain vehicle application. In another embodiment, 14 holes that are 0.5 mm in diameter may provide adequate cooling flow. Of course, fewer larger holes may be inserted into the cover surface. Additionally, more smaller holes may be inserted into the cover surface of the torque converter 105. The surface area of the one or more holes 107 may be correlated to the total surface area of the torque converter to meet cooling requirements of the vehicle application. Thus, a larger surface area of the holes 107 may lead to more fluid being sprayed onto the electrical motor. In an alternative embodiment, less surface area of the holes 107 may lead to less fluid being sprayed onto the electric motor.

Figure 2:
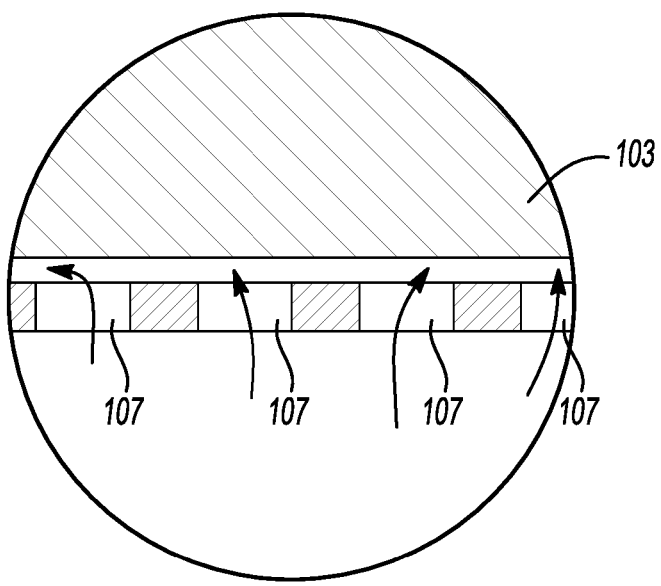

The torque converter cover may include a section that has holes or perforations 107, as shown in FIG. 2. The perforations 107 may be any size or shape. In another embodiment, instead of holes or perforations, the torque converter cover may undergo lancing during the stamping process. Thus, the material of the torque converter cover may shear away to include a slot or crack that is controlled to allow material to leak through. Other processes during the stamping process may be utilized to create holes in the torque converter cover that allow the transfer of fluid, such as piercing, lancing, pinch trimming, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST REFERENCE SYMBOLS

100 Cross-section
101 Stator
103 Rotor
105 Torque Converter
107 Holes
109 Flexplate
111 Crankshaft
113 Driveplate

What is claimed is:

1. A torque converter cover, comprising:
a cover surface of the torque converter cover in a torque converter, the cover surface including a plurality of perforations configured to allow a flow of transmission fluid on an electric motor, wherein the plurality of perforations includes a first cluster of multiple perforations that are located radially adjacent to a first end of a rotor of the electric motor, and a second cluster of multiple perforations that are located radially adjacent to a second end of the rotor.

2. The torque converter cover of claim 1, wherein the perforations are configured to allow at least one liter of transmission fluid onto the electric motor per minute.

3. The torque converter cover of claim 1, wherein the perforations are configured to spray at least one liter of transmission fluid onto an electric motor per minute.

4. The torque converter cover of claim 1, wherein the first cluster is adjacent to a drive plate connected to the torque converter.

5. The torque converter cover of claim 1, wherein the perforations are configured to spray fluid radially onto a stator of the electric motor.

6. The torque converter cover of claim 1, wherein the plurality of perforations are each individually between 0.5 millimeter to one millimeter in diameter.

7. The torque converter cover of claim 1, wherein the perforations are configured to cool between 0.5 liters per minute to 2 liter per minute.

8. The torque converter cover of claim 1, wherein the torque converter cover is utilized in the torque converter of a P1-hybrid configuration that includes a direct connection with a crankshaft of the internal combustion engine.

9. The torque converter cover of claim 1, wherein the torque converter cover is utilized in the torque converter of a P2-hybrid configuration.

10. The torque converter cover of claim 1, wherein the perforations are configured to spray fluid on both a stator of the electric motor and the rotor of the electric motor.

11. The torque converter cover of claim 1, wherein the perforations are configured to spray fluid onto a stator of the electric motor.

12. The torque converter cover of claim 1, wherein the perforations are configured to spray fluid at no more than two liters per minute.

* * * * *